United States Patent

[11] 3,593,147

[72] Inventor Richard J. Gurak
Summit, Milton I. Reicher, Parkridge, both of N.J.

[21] Appl. No. 804,175
[22] Filed Mar. 4, 1969
[45] Patented July 13, 1971
[73] Assignees International Telephone and Telegraph Corporation
Nutley, N.J.

[54] EQUAL GAIN DIVERSITY RECEIVING SYSTEM WITH SQUELCH
10 Claims, 5 Drawing Figs.

[52] U.S. Cl. .......... 325/303, 325/305, 325/369, 343/205
[51] Int. Cl. .......... H04b 7/08
[50] Field of Search .......... 325/301, 302, 303, 304, 305, 306, 307, 366, 365, 367; 343/205, 206

[56] References Cited

UNITED STATES PATENTS

| | | | |
|---|---|---|---|
| 3,029,338 | 4/1962 | Sichak | 325/302 |
| 3,487,309 | 12/1969 | Sarati | 325/305 X |

*Primary Examiner*—Benedict V. Safourek
*Attorneys*—C. Cornell Remsen, Jr., Walter J. Baum, Percy P. Lantzy, Philip M. Bolton, Isidore Togut and Charles L. Johnson, Jr.

ABSTRACT: A pair of RF diversity signals are routed to separate channels and heterodyned to two IF signals having the same IF frequency. The IF signals are combined to provide a common IF signal for demodulation. An automatic gain control signal is generated from the common IF signal and is used to control the gain of each IF signal prior to combining to assure a constant amplitude, common IF signal. The common IF signal is also used as a reference signal for a phase comparator in each channel. Each phase comparator compares the phase of its associated IF signal to the reference signal and adjusts its associated IF signal for inphase combining thereof. A squelch diode is included in each channel prior to combining under control of a squelch circuit which responds to the automatic gain control signal and the relative carrier ratios of the two IF signals. The squelch diodes supply no attenuation when the relative carrier ratios are less than a predetermined value and the squelch diode associated with the weaker IF signal supplies substantial attenuation when one of the relative carrier ratios is equal to or greater than the predetermined value. An alarm/normal arrangement is driven by the squelch circuit to indicate critical signal levels for the IF signals.

Fig. 1

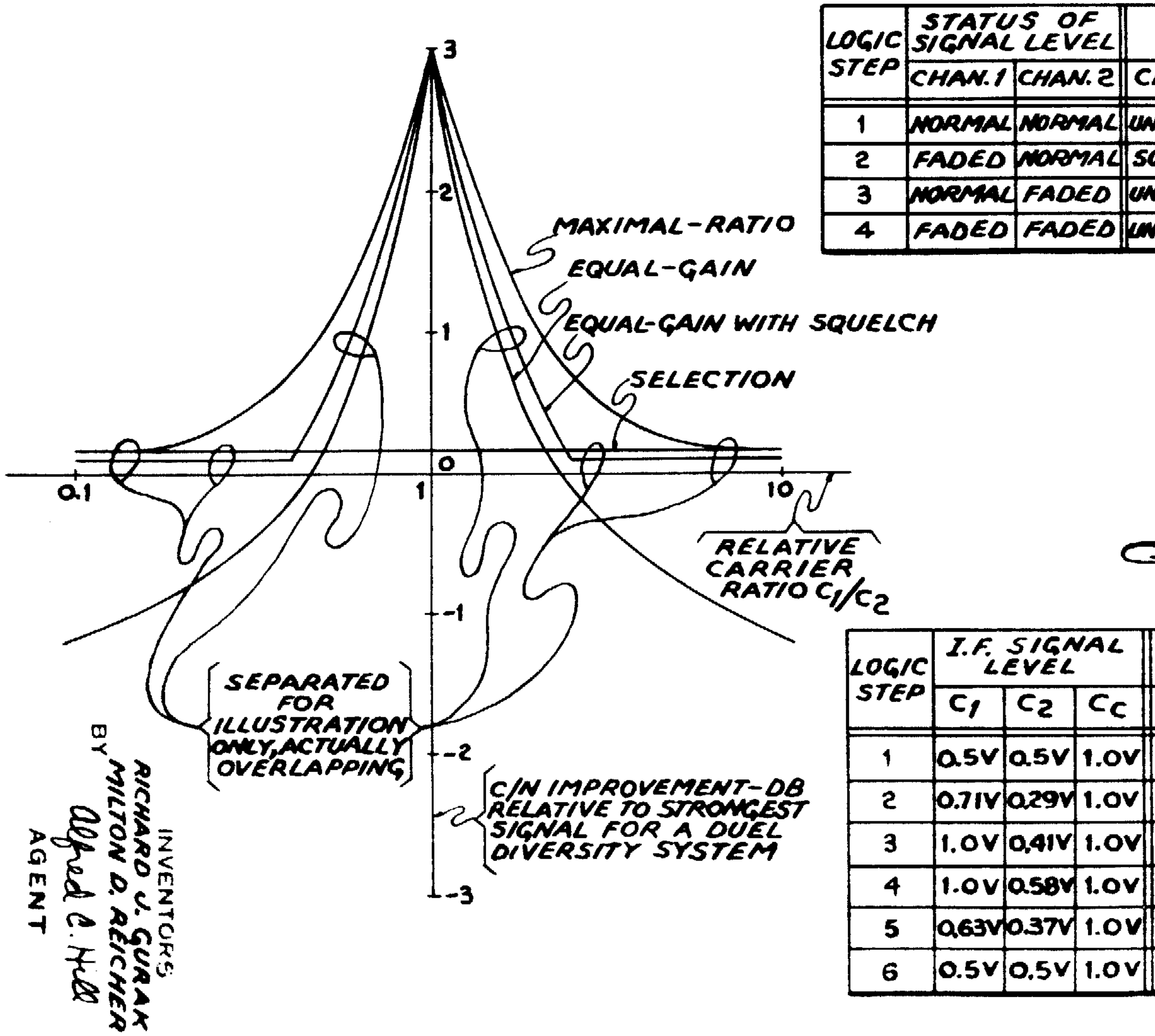

Fig. 4

| LOGIC STEP | STATUS OF SIGNAL LEVEL | | STATUS OF SQUELCH | | STATUS OF ALARM | |
|---|---|---|---|---|---|---|
| | CHAN. 1 | CHAN. 2 | CHAN. 1 | CHAN. 2 | CHAN. 1 | CHAN. 2 |
| 1 | NORMAL | NORMAL | UNSQUELCH | UNSQUELCH | NORMAL | NORMAL |
| 2 | FADED | NORMAL | SQUELCH | UNSQUELCH | ALARM | NORMAL |
| 3 | NORMAL | FADED | UNSQUELCH | SQUELCH | NORMAL | ALARM |
| 4 | FADED | FADED | UNSQUELCH | UNSQUELCH | ALARM | ALARM |

Fig. 5

| LOGIC STEP | I.F. SIGNAL LEVEL | | | D.C. LEVEL | STATUS OF SQUELCH | | FADE LEVEL |
|---|---|---|---|---|---|---|---|
| | $C_1$ | $C_2$ | $C_c$ | $E_1$ | CHAN. 1-$S_1$ | CHAN. 2-$S_2$ | DB |
| 1 | 0.5V | 0.5V | 1.0V | 0 | 1 | 1 | 0.0 |
| 2 | 0.71V | 0.29V | 1.0V | 0.42V | 1 | 1 | 7.8 |
| 3 | 1.0V | 0.41V | 1.0V | 0.59V | 1 | 0 | 7.8 |
| 4 | 1.0V | 0.58V | 1.0V | 0.42V | 1 | 0 | 4.8 |
| 5 | 0.63V | 0.37V | 1.0V | 0.26V | 1 | 1 | 4.8 |
| 6 | 0.5V | 0.5V | 1.0V | 0 | 1 | 1 | 0.0 |

INVENTORS
RICHARD J. GURAK
MILTON D. REICHER
BY Alfred C. Hill
AGENT

INVENTORS
RICHARD J. GURAK
MILTON D. REICHER
BY Alfred C. Hill
AGENT

INVENTORS
RICHARD J. GURAK
MILTON D. REICHER
BY Alfred C. Hill
AGENT

EQUAL GAIN DIVERSITY RECEIVING SYSTEM WITH SQUELCH

BACKGROUND OF THE INVENTION

This invention relates to radio-receiving systems of the space, frequency, time or angular diversity type responsive to angularly modulated carrier waves, such as for example, frequency or phase modulated carrier waves, and more particularly to a radio diversity receiving system of the predetection combining type for long distance communication.

One of the difficulties encountered by radio systems for long distance communications is that of fading, generally regarded as resulting from the interference at the receiving system between those transmitted radio waves which have followed paths of different effective lengths. Heretofore, this phase difficulty has been attacked by various forms of diversity systems, such as space diversity, frequency diversity, time diversity and angle diversity systems, as fully described in U.S. Pat. No. 3,195,049.

Diversity has achieved widespread success especially with present day long distance troposcatter communication systems. Because of the weak, rapidly fading signals inherent to troposcatter communications, these systems employ modulation techniques that provide a signal-to-noise enhancement, such as is obtainable with FM (frequency modulation) techniques, in conjunction with diversity reception to provide high quality, reliable communications.

One technique for receiving FM signals in a diversity receiver has been termed the "signal selection" techniques. With this type of receiving technique, the stronger of the two signals is accepted and the weaker of the two signals is rejected. It was found that this type of receiving technique did not provide as much of an advantage as compared to predetection combining techniques, since both of the channels of a dual diversity system, or all of the channels of a multiple diversity receiving system, contribute to the combined IF (intermediate frequency) frequency) signal output resulting in an advantage in long distance scatter-type communication systems.

One form of IF predetection combining system has been termed an "equal gain combining" system. In this system the IF signals are generated to have equal frequencies and to have a phase relationship so that the IF signals can be currently combined, in phase, and at the same relative level they are received. The output of the combiner, the common IF signal, is utilized to generate an automatic gain control (AGC) signal which is applied in common to the IF amplifiers of the diversity receiver to assure a constant amplitude, common IF signal at the output of the combiner.

Still another form of predetection combining system is called the "maximal ratio" or "ratio squared" combining system which is the most effective diversity combining system affording the greatest potential in signal reception reliability. This type of combining technique is similar to equal gain combining except for the method of controlling the gain for each predetected IF signal. Equal gain combining requires that the relative gain for each predetected IF signal be the same, whereas maximal ratio combining requires that the gain for each predetected IF signal be proportional to the signal level itself. In the resultant common IF output the weaker signal is controlled to contribute a proportionally smaller amount of itself than does the stronger signal of the combined signal. The common AGC voltage of the equal gain combining technique is still employed in the ratio squared combining arrangement to maintain the amplitude of the combined IF output signal constant.

The above-mentioned U.S. Patent points out the various advantages of predetection combining techniques with the primary advantage thereof being to increase the probability that receiver threshold is exceeded for a greater percentage of the time, thereby improving communication reliability.

SUMMARY OF THE INVENTION

An object of this invention is to provide still another type of predetection combining diversity receiving system.

Another object of this invention is to provide a diversity receiving system for combining substantially inphase a plurality FM signals employing equal gain combining techniques in combination with signal squelch which produces near maximal-ratio operation.

A feature of this invention is the provision of a diversity receiving system of the predetection combining type comprising a pair of sources of signals, the signals of each of the sources having random phase relation with respect to each other; first means coupled to the sources to provide first and second intermediate frequency signals each having the same frequency; first gain control means coupled to the first means responsive to the first intermediate frequency signal; second gain control means coupled to the first means responsive to the second intermediate frequency signal; first variable attenuation means coupled to the first control means; second variable attenuation means coupled to the second control means; second means coupled to the first and second attenuation means to combine the first and second intermediate frequency signals; third means coupled to the output of the second means, the output of the first and second control means and the first means to vary the phase relation of the first and second intermediate frequency signals for inphase combining in the second means; fourth means coupled to the output of the second means to produce a control signal for coupling to the first and second control means to control the amplitude of each of the first and second intermediate frequency signals to produce a constant amplitude signal at the output of the second means; and fifth means coupled to the output of the fourth means, the output of the first and second control means, and the first and second attenuation means to control the first and second attenuation means for squelching the weaker of the first and second intermediate frequency signals when the relative carrier ratio thereof is equal to or exceeds a predetermined value and for permitting the combining of the first and second intermediate frequency signals when the relative carrier ratio is less than the predetermined value.

BRIEF DESCRIPTION OF THE DRAWING

The above mentioned and other features and objects of this invention will become more apparent by reference to the following description taken in conjunction with the accompanying drawings, in which:

FIG. 1 is a series of curves comparing the equal-gain with the squelch technique of the present invention with the signal selection technique and the previously known predetection maximal-ratio and equal-gain combining techniques;

FIGS. 4 and 5 are tables useful in illustrating and explaining the operation of the predetection combining system of FIGS. 2 and 3.

DESCRIPTION OF THE PREFERRED EMBODIMENT

Referring to FIG. 1, there is illustrated therein curves comparing the selection diversity technique with predetection combining techniques of the prior art and the present application. It should be noted that the circled curves and axis are actually overlapping, or coincident rather than separated as illustrated to indicate that the equal gain with squelch coincides in part with the curve for equal-gain combining and in part with the selection technique and closely approximates the maximal-ratio type diversity combining system. It should be further noted that the vertical axis is representative of the carrier to noise (C/N) improvement in db. (decibel) relative to the strongest signal for a dual diversity system on a linear scale, while the horizontal axis is the relative carrier ratio $C_1/C_2$ of the two diversity signals on a logarithmic scale. The carrier $C_1$ and the carrier $C_2$ refer to the IF carrier in channel 1 and the IF carrier in channel 2, respectively, of the system of FIG. 2 and are appropriately identified therein as to their point of occurrence.

For purposes of explanation, certain values of relative carrier ratio and attenuation as well as voltages are employed in the following description. It is to be remembered, however, that these values are only for purposes of explanation and may be modified to meet specifications of a particular application of the system of this invention.

Figure 2:
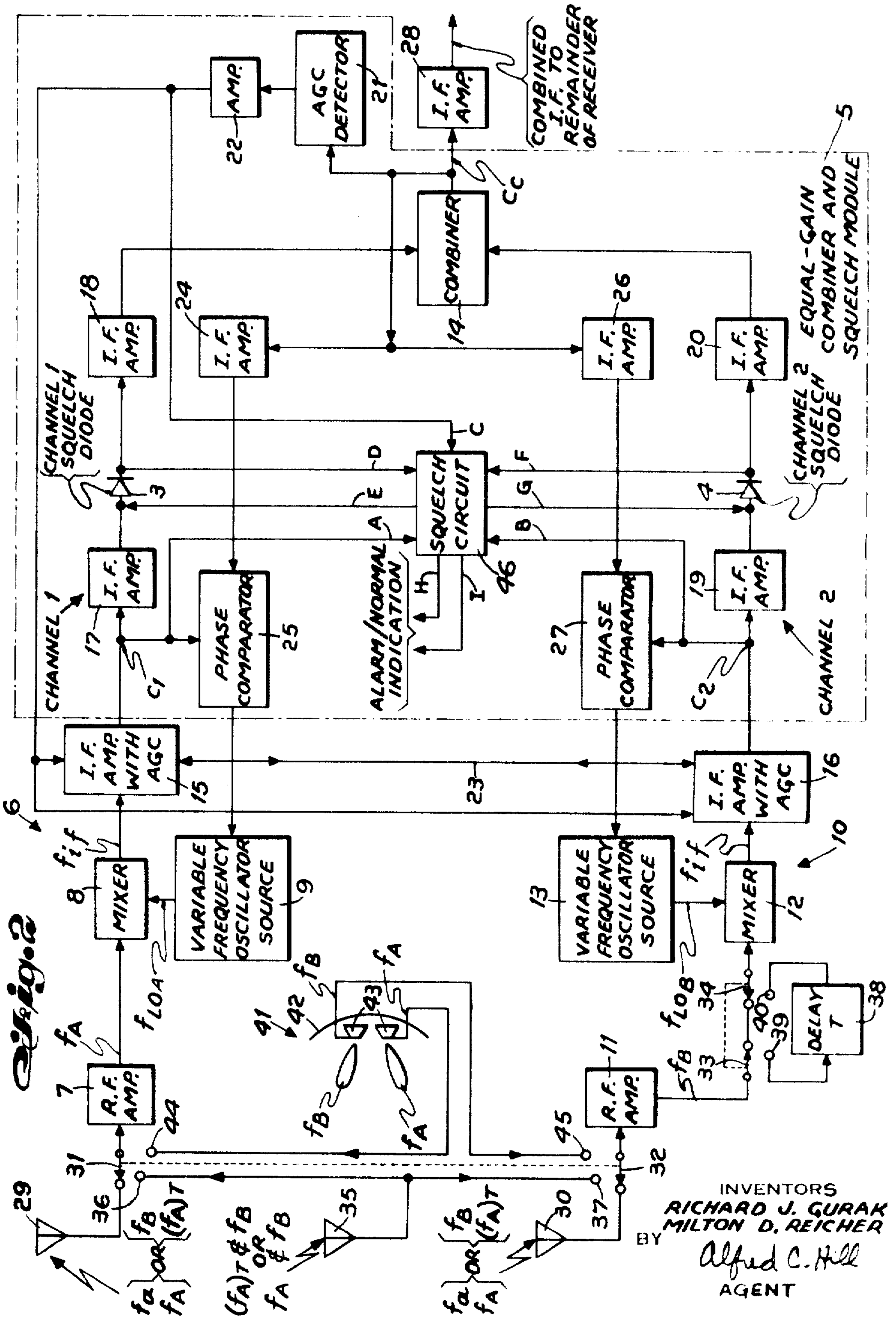
FIG. 2 is a block diagram of the equal-gain with squelch predetection combining system in accordance with the principles of this invention.

Referring to FIG. 2, there is illustrated therein a diversity receiving system incorporating the equal-gain with squelch techniques in accordance with the principles of this invention. Ideally, the equal-gain combining with squelch technique squelches the weaker of two IF carrier signals, when the relative carrier ratio is equal to or exceeds 7.8 db. When the relative carrier ratio is less than 7.8 db. equal-gain combining is maintained. The squelch action is achieved by back-biasing a diode, such as diodes 3 and 4, which are in series with the IF signal of IF signal channels 1 and 2, when $C_2/C_1$ or $C_1/C_2$ equal 7.8 db. Approximately 30 db. of attenuation is obtained when either of diodes 3 or 4 are back biased. In addition to IF signal attenuation the squelch circuitry provides outputs for carrier level alarms as illustrated in the table of FIG. 4.

FIG. 2 illustrates various diversity receiving systems in addition to the equal-gain combiner and squelch module 5. Signal source 6 includes RF amplifier 7, mixer 8 and variable frequency oscillator source 9 with the output of mixer 8 being coupled to channel 1. Signal source 10 includes RF amplifier 11, mixer 12 and variable frequency oscillator source 13 with the output of mixer 12 being coupled to channel 2. While sources 9 and 13 may be separate variable frequency oscillators incorporating, for instance, reactance tubes, or transistors to adjust the frequency of the oscillator sources, in practice, it would be desirable to arrange the sources of local oscillator frequencies as follows (not shown). A crystal-controlled oscillator having very high frequency stability would be coupled to two mixers with the other input of the mixers being coupled to separate variable frequency oscillators with the output of these mixers being coupled to mixer 8 and mixer 12 with the frequency control for phase adjustment being provided by controlling the variable frequency oscillator coupled to the mixers supplied from the highly stable crystal oscillator.

The signals of each of sources 6 and 10 have been subjected to different phase changes, these phase changes being random relative to each other and to the original signals, such as may have been transmitted from a distant transmitter. The IF signals at the output of sources 6 and 10 are adjusted to have a common IF frequency $f_{if}$ prior to coupling to channels 1 and 2 by cooperation of oscillator sources 9 and 13 and their associated mixers 8 and 12. Thus, it is a requirement in the operation of the signal combining system of this invention that the signals at the output of mixers 8 and 12 must have the same frequencies to enable phase adjustment thereof and combining in combiner 14. The signals from mixers 8 and 12 are coupled through IF amplifiers 15 and 16 with AGC, respectively. The signal of channel 1 is coupled from IF amplifier 15 and 16 with AGC, respectively. The signal of channel 1 is coupled from IF amplifier 15 through IF amplifier 17, then through diode 3, and then through IF amplifier 18 prior to being coupled to combiner 14. The signal of channel 2 is coupled from IF amplifier 16 to IF amplifier 19, then through diode 4 prior to coupling IF amplifier 20 and then through prior to being coupled to combiner 14. The output from combiner 14 is coupled to AGC detector 21 and, hence, through amplifier 22 to the AGC control circuitry of amplifiers 15 and 16 to provide common AGC for these amplifiers and the IF signal of channels 1 and 2 to assure a constant amplitude output from combiner 14.

Conductor 23 interconnects common circuit points in amplifiers 15 and 16 to compensate for circuit variations in these amplifiers and particularly circuit variations due to temperature variations.

The output from combiner 14 also is coupled through IF amplifier 24 to phase comparator 25 which has its other input coupled to the output of IF amplifier 15 to provide a phase control voltage for coupling to oscillator source 19 to adjust the frequency thereof so that the phase of the IF signal at the output of mixer 8 is maintained in the desired relationship with respect to the phase of the intermediate frequency signal at the output of mixer 12 to ensure inphase combining in combiner 14. In a similar manner, phase control for channel 2 IF signal is provided by coupling the output of combiner 14 through IF amplifier 26 to phase comparator 27 which has its other inputs coupled to the output of IF amplifier 16 to produce the phase control voltage for coupling to source 13. Thus, phase comparator 25 and 27 control the frequency of an oscillator of sources 9 and 13 to assure the proper phase relationship between the IF signals at the output of mixers 8 and 12 to ensure inphase combining in combiner 14.

The output of combiner 14 is also coupled to IF amplifier 28 prior to coupling to the remainder of the receiver wherein amplitude limiting and frequency demodulation is accomplished for utilization of the combined IF signal.

It can be stated that the phase control system employed in the equal-gain combiner and squelch diversity receiving system of this invention will function to adjust the phase of the IF output signals of mixers 8 and 12 to be in a predetermined phase relationship for inphase combining in combiner 14, if the following relation is met:

$$|f_A - f_{LO_A}| = |f_B - f_{LO_B}| = |f_{if} \qquad (1)$$

As mentioned hereinabove, it is preferred to adjust the phase of the IF signals to be combined to maintain the signals being combined in a predetermined phase relationship for inphase combining in combiner 14 by adjusting the frequency of the local oscillator signals delivered by sources 9 and 13. The preference for frequency adjusting of the oscillatory output for phase control of the phase relationship of the IF output signals of mixers 8 and 12 is due to the fact that frequency control for phase adjustment has a greater control range than can be achieved by controlling the phase through means of a phase shifter. Frequency control for phase adjustment to obtain a phase-lock between the two IF signals is a continuously operating arrangement and can compensate for many revolutions of radio frequency (RF) phase variation between the signals being phase controlled. 39 The foregoing discussion has been concerned with the description of the phase 48 and equal-gain control IF amplifiers 15 and 16 to provide the desired predetermined phase relationship between the IF signals coupled to channels 1 and 2 to enable in phase combining in combiner 14 and to maintain the amplitude of the common IF signal output of combiner 14 constant. In addition to these arrangements employed in the usual equal-gain combiner arrangement, the present invention incorporates squelch circuit 46 which is coupled to the common AGC bus at the output of amplifier 22 and to the outputs of amplifiers 15 and 16. Squelch circuit 46 is also coupled to control the conduction of squelch diodes 3 and 4. Squelch circuit 46 normally forward biases these diodes, but when the relative carrier ratio $C_1/C_2$ or $C_2/C_1$ is equal to or exceeds 7.8 db. the appropriate one of the diodes 3 and 4 are back biased so as to present substantial attenuation (30 db.) to its associated IF and antennas to effectively remove this IF signal from the input of combiner 14. Squelch circuit 6 also provides outputs The carrier level alarms in accordance with the table of FIG. 4. Circuit 46 is unique in that there is an interaction between the operation of the squelch circuit and the common AGC signal of the equal-gain combiner to carry out the desired squelching operation so as to provide an operating characteristic approaching that of a maximal-ratio predetection combining diversity system.

The following discussion will point out how the above-described equaligain combiner with squelch arrangement of the present invention may be employed in a space diversity, frequency diversity, time diversity or angle diversity system. The primary difference between these diversity systems is the type of signals present in sources 6 and 10.

Consider first a space diversity system. In this type of diversity system, a pair of antennas 29 and 30 are sufficiently spaced from each other to provide an effective path difference from a transmitting antenna to these antennas for a carrier signal having the same frequencies to thereby provide different fading characteristics. In the illustration of FIG. 2 for operation in a space diversity system, $f_A=f_B$ and antennas 29 and 30 are spaced by a number of wave lengths at the operating frequency of the system. The outputs of antennas 29 and 30 are, respectively, coupled to RF amplifiers 7 and 11 by switches 31 and 32 in the position illustrated. The output of amplifier 7 is coupled to mixer 8 and the output of amplifier 11 is coupled to mixer 12 by means of switches 33 and 34 having the illustrated position. As pointed out above, for operation of the circuit of this invention the relationship of equation (1) must be met. Therefore, since $f_A=f_B$, then $f_{LO_A}=f_{LO_B}$. With this relationship met, the phase control circuit and the combiner of this invention will operate as described herein.

Now let us consider a frequency diversity system. In this type of diversity system, it is required that the frequencies received, $f_A$ and $f_B$ be spaced a sufficient amount to be uncorrelated, that is, to have different fading characteristics. There is no requirement that two antennas, such as antennas 29 and 30, be employed, or that these antennas be spaced. The signals, $f_A$ and $f_B$, will be coupled from antenna 29 through switch 31 in the illustrated position to amplifier 7 which is tuned to be responsive to only the signals $f_A$. Likewise, the signals $f_A$ and $f_B$ are coupled from antenna 30 through switch 32 in the illustrated position to amplifier 11 which is tuned to be responsive to only the signals $f_B$. Alternatively, the signals $f_A$ and $f_B$ may be received by the single antenna 35 and coupled to amplifiers 7 and 11 through switches 31 and 32 when these switches are positioned to be connected to contacts 36 and 37, respectively.

Regardless of which arrangement is used to receive the signals $f_A$ and $f_B$, the output of amplifier 7 is an amplified version of signals $f_A$ and the output of amplifier 11 is an amplified version of signal $f_B$. The outputs of amplifiers 7 and 11 are coupled directly to their associated mixers 8 and 12. As before, the relationship of equation (1) must be met. This means that the frequency of the oscillatory signals, $f_{LO_A}$ and $f_{LO_B}$, produced by sources 9 and 13, must be adjusted relative to their associated carrier frequencies, $f_A$ and $f_B$, to produce IF signals having the same frequency at the outputs of mixers 8 and 12. It is further desired, but not necessarily limited thereto, that both the oscillatory outputs of sources 9 and 13 have a frequency above or below both of the signals $f_A$ and $f_B$ so that modulation on the resultant IF signal, $f_{if}$, be in the same direction. With proper adjustment of the oscillatory outputs of sources 9 and 13, the IF output signals of mixers 8 and 12 will have the same frequency and will be operated on to maintain the desired phase relationship with respect to each other for combining by the combiner of this invention as described herein.

The third diversity system to be considered is a time diversity system. In a time diversity system, the diversity signals are rendered uncorrelated by spacing them in time relative to each other. The manner of maintaining the time space signals in separate communication channels may be provided by employing carrier signals having closely spaced frequencies, the frequency spacing not being sufficient to provide diversity advantage, or by cross-polarization techniques. In those systems employing cross-polarization techniques, the frequencies $f_B$ and $f_A$ would be equal while in those time diversity systems employing frequency spacing to establish a communication path, frequency signals $f_A$ and $f_B$ would have different values. Regardless of how the time diversity signals are maintained in their communication paths, the signals present at antennas 29 and 30 will include a signal $f_B$ and a signal $(f_A)_T$ the latter symbol being employed to indicate that the modulation of signal $f_A$ is delayed by time T with respect to the modulation of signals $f_B$. It is to be understood that both signals could be delayed in time, however, the relative time displacement is the important factor. The signals received by antennas 29 and 30 are coupled to the proper signal channel to thereby enable the signals to be placed in time coincidence in the receiving system. If the time diversity signals are separated on a frequency basis, the receiving portion of this receiving system would operate as described hereinabove with respect to a frequency diversity system and if the time diversity signals are separated by cross-polarization, one of antennas 29 and 30 would be a vertically polarized antenna responsive to $(f_A)_T$ which is vertically polarized, while the other antenna of antennas 29 and 30 would be a horizontally polarized antenna responsive to signal $f_B$ which would be horizontally polarized. Once the time diversity signals are applied to the proper signal channel of the receiving system, either by frequency separation or cross-polarization, they are placed in time coincidence by providing in one of the signal channels a time delay means 38 which is placed in operative relationship with the output of amplifier 11 by positioning switches 33 and 34 in a conductive relationship with contacts 39 and 40. In this manner, the RF signal coupled to mixers 8 and 12 are in time coincidence to the operated upon in mixers 8 and 12 by the oscillatory signals of sources 9 and 13 to provide IF signals in each of the signal channels 1 and 2 having the same frequency. When the time diversity signals are separated by cross-polarization techniques, the oscillatory signals $f_{LO_A}$ and $f_{LO_B}$ will be equal since the signals $f_A$ and $f_B$ are equal. On the other hand, if a frequency technique is employed for signal separation, it will be necessary to adjust the oscillatory signals $f_{LO_A}$ and $f_{LO_B}$ relative to $f_A$ and $f_B$ to provide IF signals at the output of mixers 8 and 12 having the same frequency. Once the frequency equality of the IF signals and the output of mixers 8 and 12 is established the phase control loop and combiner of this invention operates as described herein.

The fourth diversity system to be considered is an angle diversity system. In an angle diversity system, an antenna 41 which may include a parabolic reflector surface 42 and a plurality of horns 43 provide a plurality of narrow radiation beams intersecting their mates from a similar transmitting antenna array. Each of the beams carry a carrier signal having the same modulation thereon, the signals on the beams being rendered uncorrelated by the angular displacement between the beams of the radiation. The confinement of a signal to a particular communication path as represented by the mating transmitting and receiving antenna radiation beam may be enhanced by employing different carrier frequencies although this is not a requirement to produce uncorrelated signals. Each receiving horn 43 is associated with its own signal channel by a direct connection between the receiving horns 43 and the signal channel as provided by switches 31 and 32 when positioned to be in contact with contacts 44 and 45, respectively. The outputs of amplifiers 7 and 11 are coupled to mixers 8 and 12 which, in cooperation with the oscillatory signals from sources 9 and 13 produce an IF signal at the output of each of mixers 8 and 12 having an identical frequency. Once the equality of frequency of intermediate frequency signals is established, the phase control loop and combiner of this invention will operate as described herein.

The foregoing description has been directed to the utilization of the combining arrangement of this invention in conjunction with various types of diversity signals as well as the manner of combining the resulting equal frequency IF signals, phase controlling these IF signals relative to each other for inphase combining in combiner 14, providing common AGC control for amplifiers 15 and 16 to assure a constant amplitude output from combiner 14, and the squelching of the weaker of the two IF signals when the relative carrier ratio is equal to or greater than 7.8 db.

Figure 3:
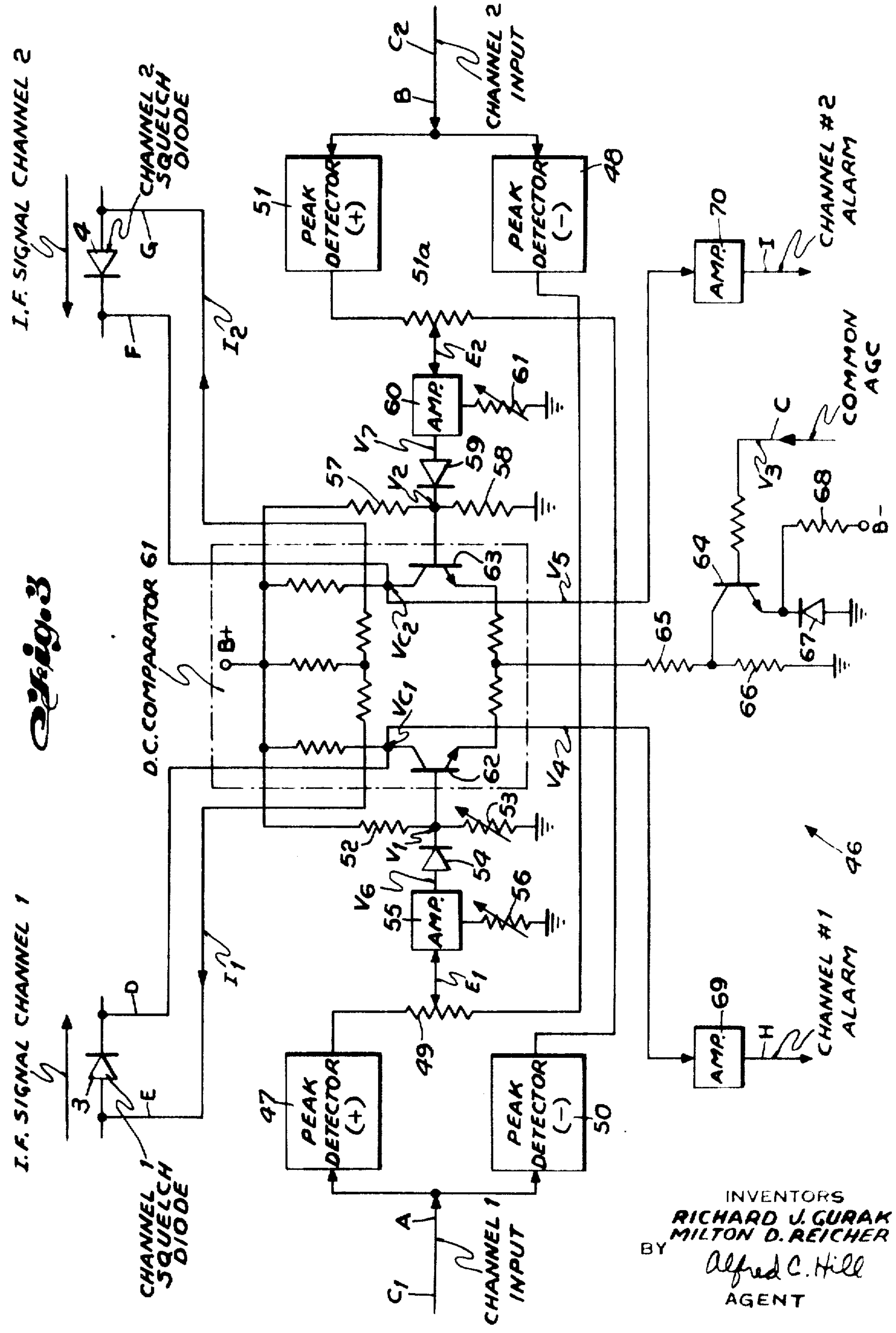
FIG. 3 is a schematic diagram, partially in block form, of the squelch circuit of FIG. 2.

Referring to FIG. 3, there is illustrated in schematically, partially in block form, squelch circuit 46 of FIG. 2. Positive peak detector 47 coupled to channel 1 input from amplifier 15 and negative peak detector 48 coupled to channel 2 input at the output of amplifier 16 in cooperation with potentiometer 49 cooperate to produce a voltage proportional to the relative carrier ratio $C_1/C_2$. Negative peak detector 50 coupled to the channel 1 input provided by the output of amplifier 15 and positive peak detector 51 coupled to the channel 2 input provided by the output of amplifier 16 together with potentiometer 51a provides a voltage proportional to the relative carrier ratio $C_2/C_1$. The voltage divider provided by resistor 52 and potentiometer 53 provide a voltage V1 to back bias diode 54 with amplifier 55 being coupled between potentiometer 49 and diode 54. The gain of amplifier 55 is adjusted by potentiometer 56 to have sufficient gains so that at the predetermined value 7.8 db. of the relative carrier ratio $C_1/C_2$ the bias V1 is overcome and diode 54 is forward biased. The voltage divider including resistors 57 and 58 provide a voltage V2 to back bias diode 59 with amplifier 60 having its gain adjusted by potentiometer 61 so that at the predetermined value 7.8 db. of relative carrier ratio $C_2/C_1$ the back bias voltage V2 is overcome so that diode 59 is forward biased. The voltages V1 and V2 are coupled to a DC comparator 61. DC comparator 61 includes transistors 62 and 63 in the circuit arrangement illustrated. Transistor 62 and 63 under the influence of V1 and V2, as adjusted by potentiometer 53, are conducting and provide substantially equal voltages VC1 and VC2 which forward biases diodes 3 and 4 and provides a current I1 equal to current I2 of approximately 1.8 milliamps (ma.).

Transistor 64 is coupled to the common AGC output of amplifier 22, (FIG. 2), with its collector coupled to the voltage divider formed by resistors 65 and 66. The purpose of diode 67 and resistor 68 is to compensate for temperature variation of the base to emitter junction of transistor 64.

Squelch action is achieved as described hereinbelow. Starting with equal IF inputs at A and B, detectors 47—51a provide DC outputs E1 and E2 of the same magnitude. With amplifiers 55 and 60 at normal operating gain potentiometers 49 and 51a are adjusted to provide 0 volts DC at V6 and V7. Voltages V1 and V2 are adjusted so that the squelch diodes 3 and 4 are identically forward biased by the conduction on transistor 62 and 63 with, as mentioned hereinabove, approximately 1.8 milliamps for currents I1 and I2. Voltage V3 is derived from the common AGC voltage at the output of amplifier 22 (FIG. 2) and normally causes transistor 64 to provide resistor 65 with a low impedance path to ground. Voltages V4 and V5, produced at the collectors of transistor 62 and 63, are such as to produce a normal condition at outputs H and I of amplifiers 69 and 70. This corresponds to the logic step No. 1 of FIG. 4.

A reduction in V3, such as that caused a decrease in the combined $(C_1+C_2)$ IF signal level, causes transistor 64 to be cut off. The total emitter impedance of comparator 61, therefore, increases form the value of resistor 65 to the value of resistor 65 plus the value of resistor 66. This results in a reduction in the current flow in transistor 62 and 63 of comparator 61 and a resultant increase in voltages VC1 and VC2 causing V4 and V5 to increase. This increase produces an alarm condition at outputs H and I. Diodes 3 and 4 remain forward biased at a reduced forward current of 0.4 ma. and unsquelched, meeting the requirements of logic step No. 4 of FIG. 4.

An increase in the input carrier level of channel 1 causes the IF voltage at A to increase and at B to decrease due to the common AGC. This causes V6 to become plus and V7 to become minus. When the relative carrier level is 7.8 db., V6 exceeds the bias V1 causing an unbalance in DC comparator 61 by increasing the current flow through transistor 62, causing an increase in the emitter voltage of transistor 62 which causes the current of transistor 63 to decrease, since V7 is less than V2, causing an increase in the voltage VC2. Thus, current I1 increases to approximately 3 ma. and diode 4 becomes back biased by the increase of voltage VC2 by approximately 3.5 volts DC. Therefore, diode 3 conducts more thereby reducing its initial IF insertion loss very slightly. However, diode 4 by virtue of its back bias increases its insertion loss by approximately 30 db. Thus, the weak IF signal in channel 2 is squelched by the strong signal in channel 1. The DC comparator unbalance causes voltage V5 to increase due to the increase of voltage VC2 and voltage V4 to decrease due to the decrease of voltage VC1 resulting in a normal condition at output H and an alarm condition at output I. Since the squelch circuit is symmetrical, an increase in the signal level of channel 2 will cause the signal in channel 1 to be squelched in a manner identical to that mentioned hereinabove for channel 2. This concept of the stronger signal squelching the weaker signal is very important in the operation of the squelch combining system. Thus, the requirement of logic steps Nos. 3 and 4 of FIG. 4 are satisfied.

The concept of a common AGC system in a diversity receiver with predetection combining and IF squelch is an important feature of this invention. It is the catalyst that causes the squelch circuitry to rapidly trigger an IF channel from the unsquelched state to the squelched state and vice versa. Its role n the operation of the squelch system can be illustrated as follows, when considering FIG. 3 and FIG. 5. The following equations 2, 3 and 4 are used to describe the operation of the squelch system.

$$C_c=S_1C_1+S_2C_2 \quad (2)$$

$$E_1=K(C_1-C_2) \quad (3)$$

$$E_2K(C_2-C_1) \quad (4)$$

S1 and S2 are logic operators and are "1" if the channel is unsquelched and "0" if it is squelched. $C_c$ is the combined output, held constant by the common AGC system. $C_c$ is the algebraic sum of the IF signals in the individual channels at the output of combiner 14 (FIG. 2). E1 and E2 represent the DC voltage difference between the detected IF signals in channels 1 and 2.

The table of FIG. 5 is a numeric representation of the squelch cycle. For purposes of this illustration, it is assumed that the detector constant K is unity, so that the DC voltages $E_1$ and $E_2$ are the algebraic differences between $C_2$ and $C_1$. Logic step 1 illustrates equal IF carrier levels such that V6 is less than V1 and V7 is less than V2 leaving comparator 61 in its balanced condition and diodes 3 and 4 in their unsquelched condition, resulting, in normal conditions at outputs H and I. Logic step No. 2 illustrates that channel 2 IF carrier is faded by 7.8 db. ($C_1/C_2$=7.8 db.). This step shows the voltage level just before channel 2 diode 4 is squelched. In this step V7 is still less than V2, but V6 exceeds V1 sufficiently to establish the unbalanced condition in comparator 61. In logic step 3, just after channel 2 is squelched, only channel 1 contributes to the output, therefore, $C_1$ increases from 0.71 volts to 1.0 volts. The channel 2 level increases also due to the common AGC action. The difference voltage E1, however, increases from 0.42 volts to 0.59 volts, and channel 2 is driven further into squelch because of the common AGC. In order to bring channel 2 out of squelch, channel 2 carrier level must be increased. In logic step No. 4, channel 2 carrier level is increased to a point just before unsquelch so that $E_1$=0.42 volts, the same difference voltage as in logic step 2. The increase in channel 2 carrier level is 0.58/0.41=3 db. In other words, 3 db. of hysteresis (defined as the difference in carrier fade between squelch and unsquelch) can be expected. In logic step No. 5, just after channel 2 is unsquelched, the relative carrier ratio $C_1/C_2$ is maintained at 4.8 db., the same ratio as in step No. 4. In logic step No. 6, the carrier signals are returned to equal IF carrier levels.

The above process as depicted in FIG. 5 is similar for a fade of the signal in channel 1 with identical results. The predicted 3 db. hysteresis is not realized in practice. Measured value of hysteresis are from 0.2 db. to 1.5 db. depending on the amount of AGC feedback, change in detector efficiency, and the slight decrease in diode attenuation of the unsquelched channel due to the increase in forward current through the squelch diode.

Effects of temperature variation on the squelch performance are minimal. Examination of FIG. 3 shows a symmetrical system, with one exception, so that relative changes due to temperature are canceled. The amplifiers 55 and 60 are stable operational amplifiers with high feedback. Critical DC voltages throughout the circuit have been kept high to minimize the effects of diode and transistor variations. The one exception in the circuit is the amplifier including transistor 64 which requires diode compensation for temperature variations of the base to emitter junction voltage of transistor 64. This temperature compensation is provided by diode 67 and resistor 68 coupled between ground and B−.

While we have described above the principles of our invention in connection with specific apparatus, it is to be clearly understood that this description is made only by way of example and not as a limitation to the scope of our invention as set forth in the objects thereof and in the accompanying claims.

We claim:

1. A diversity receiving system of the predetection combining type comprising:

a pair of sources of signals, the signals of each of said sources having random phase relation with respect to each other;

first means having a phase control terminal, first and second outputs, a first input coupled to one of said sources and a second input coupled to the other of said sources to provide at said first output a first intermediate frequency signal and at said second output a second intermediate frequency signal, said first and second intermediate frequency signals each having the same frequency;

first gain control means having a gain control terminal, an input coupled to said first output of said first means and an output for said first intermediate frequency signal;

second gain control means having a gain control terminal, an input coupled to said second input of said first means and an output for said second intermediate frequency signal;

first variable attenuation means having an input coupled to the output of said first control means and an output for said first intermediate frequency signal;

second variable attenuation means having an input coupled to the output of said second control means and an output for said second intermediate frequency signal;

second means having an output, a first input coupled to the output of said first attenuation means and a second input coupled to the output of said second attenuation means to combine said first and second intermediate frequency signals;

third means having input means coupled to the output of said second means and the output of said first and second control means and output means coupled to the phase control terminal of said first means to vary the phase relation of said first and second intermediate frequency signals for inphase combining in said second means;

fourth means having an output and an input coupled to the output of said second means to produce a control signal at the output of said fourth means for coupling to the gain control terminal of both said first and second control means to control the amplitude of each of said first and second intermediate frequency signals to produce a constant amplitude signal at the output of said second means; and fifth means having input means coupled to the output of said fourth means, the output of said first and second control means, and the output of both said first and second attenuation means and an output means coupled to the input of both said first and second attenuation means to control said first and second attenuation means for squelching the weaker of said first and second intermediate frequency signals when the relative carrier ratio thereof is equal to or exceeds a predetermined value and for permitting the combining of said first and second intermediate frequencies when the relative carrier ratio is less than said predetermined value.

2. A system according to claim 1, wherein said first and second control means each include an intermediate frequency amplifier with automatic gain control; and further including a conductor interconnecting each of said amplifiers to compensate for circuit variations therein due to temperature variations.

3. A system according to claim 1, wherein said first and second attenuation means each include a diode.

4. A system according to claim 1, wherein said third means includes a first phase comparator coupled to the output of said second means and the output of said first control means, and a second phase comparator coupled to the output of said second means and the output of said second control means, the outputs of said first and second phase comparators being coupled to said first means.

5. A system according to claim 1, wherein said first means includes a first mixer coupled to one of said sources, a first variable frequency oscillator means having an output signal coupled to said first mixer, the said first mixer mixing the signal of one of said sources and output signal of said first oscillator means to produce said first intermediate frequency signal, a second mixer coupled to the other of said sources, and a second variable frequency oscillator means having an output signal coupled to said second mixer, said second mixer mixing the signal of the other of said sources and the output signal of said second oscillator means to produce said second intermediate frequency signal, said first and second oscillator means being coupled to the phase control terminal of said first means and controlled by said third means to vary the phase relation of said first and second intermediate frequency signals for inphase combining in said second means.

6. A system according to claim 1, wherein said fifth means includes sixth means coupled to the output of said first and second control means to produce a first voltage equal to the algebraic sum of said first and second intermediate frequency signal and a second voltage equal to the algebraic sum of said second and first intermediate frequency signal; and seventh means coupled to said sixth means, said fourth means and said first and second attenuation means to control said first and second attenuation means to have substantially no attenuation when both said first and second voltages are less than said predetermined value and to control one of said first and second attenuation means to have substantial attenuation when one of said first and second voltages is equal to or exceeds said predetermined value.

7. A system according to claim 6, further including eighth means coupled to said seventh means to indicate a normal condition for both said first and second intermediate frequency signals when both of said first and second voltages are less than said predetermined value, a normal condition for one of said first and second intermediate frequency signals and an alarm condition for the other of said first and second intermediate frequency signal when one of said first and second voltages is equal to or exceeds said predetermined value, and an alarm condition for both said first and second intermediate frequency signals when both said first and second voltages are equal to or exceeds said predetermined value.

8. A system according to claim 6, wherein said first attenuation means includes a first diode coupled to said first control means; said second attenuation means includes a second diode coupled to said second control means; said seventh means includes comparator means having a first input, a second input, a third input, a first output and a second output, said third input being coupled to said fourth means, said first output being coupled to said first diode to normally forward bias said first diode, and said second output being coupled to said second diode to normally forward bias said second diode, a third diode, a fourth diode, a first voltage divider to develop a given voltage coupled between said first input and said third diode to normally back bias said third diode by said given voltage, and a second voltage divider to develop said given voltage coupled between said second input and said fourth diode to normally back bias said fourth diode by said given voltage; and said sixth means includes a first positive peak detector coupled to said first control means, a first negative peak detector coupled to said second control means, a first combiner coupled to said first positive peak detector and said first negative peak detector, a first amplifier coupled between said first combiner and said third diode to produce said first voltage, said first amplifier having a gain sufficient to provide an amplitude for said first voltage so that at said predetermined value said given voltage is overcome, said third diode is forward biased, and said comparator produces on its second output sufficient voltage to back bias said second diode, a second positive peak detector coupled to said second control means, a second negative peak detector coupled to said first control means, a second combiner coupled to said second positive peak detector and said second negative peak detector, and a second amplifier coupled between said second combiner and said fourth diode to produce said second voltage, said second amplifier having a gain sufficient to provide an amplitude for said second voltage so that at said predetermined value said given voltage is overcome, said fourth diode is forward biased, and said comparator produces on its first output sufficient voltage to back bias said first diode.

9. A system according to claim 1, wherein said first means includes a first mixer coupled to one of said sources, a first variable frequency oscillator means having an output signal coupled to said first mixer, said first mixer mixing the signal of one of said sources and the output signal of said first oscillator means to produce at its output said first intermediate frequency signal, a second mixer coupled to the other of said sources, and a second variable frequency oscillator means having an output signal coupled to said second mixer, said second mixer mixing the signal of the other of said sources and the output signal of said second oscillator means to produce at its output said second intermediate frequency signal;

said first control means includes a first intermediate frequency amplifier with automatic gain control means having an output, an input coupled to the output of said first mixer and a gain control terminal coupled to the output of said fourth means;

said second control means includes a second intermediate frequency amplifier with automatic gain control means having an output, an input coupled to the output said second mixer and a gain control terminal coupled to the output of said fourth means;

said first attenuation means includes a first diode coupled to the output of said first intermediate frequency amplifier;

said second attenuation means includes a second diode coupled to the output of said second intermediate frequency amplifier;

said third means includes a first phase comparator coupled to the output of said second means, the output of said first intermediate frequency amplifier, and said first oscillator means, and a second phase comparator coupled to the output of said second means, the output of said second intermediate frequency amplifier, and said second oscillator means; and said fifth means includes sixth means coupled to the output of both said first and second intermediate frequency amplifiers to produce a first voltage equal to the algebraic sum of said first and second intermediate frequency signals and a second voltage equal to the algebraic sum of said second and first intermediate frequency signals, and seventh means coupled to said sixth means, the output of said fourth means and said first and second diodes to control said first and second diodes to have substantially no attenuation when both said first and second voltages are less than said predetermined value and to control one of said first and second diodes to have substantial attenuation when one of said first and second voltages is equal to or exceeds said predetermined value; and further including a conductor interconnecting each of said first and second intermediate frequency amplifiers to compensate for circuit variations therein due to temperature variations.

10. A system according to claim 9, wherein said seventh means includes comparator means having a first input, a second input, a third input, a first output and a second output, said third input being coupled to said fourth means, said first output being coupled to said first diode to normally forward bias said first diode, and said second output being coupled to said second diode to normally forward bias said second diode, a third diode, a fourth diode, a first voltage divider to develop a given voltage coupled between said first input and said third diode to normally back bias said third diode by said given voltage, and a second voltage divider to develop said given voltage coupled between said second input and said fourth diode to normally back bias said fourth diode by said given voltage; and said sixth means includes a first positive peak detector coupled to said first intermediate frequency amplifier;

a first negative peak detector coupled to said second intermediate frequency amplifier, a first combiner coupled to said first positive peak detector and said first negative peak detector, a first amplifier coupled between said first combiner and said third diode to produce said first voltage, said first amplifier having a gain sufficient to provide an amplitude for said first voltage so that at said predetermined value said given voltage is overcome, said third diode is forward biased, and said comparator produces on its second output sufficient voltage to back bias said second diode, a second positive peak detector coupled to said second intermediate frequency amplifier, a second negative peak detector coupled to said first intermediate frequency amplifier, a second combiner coupled to said second positive peak detector and said second negative peak detector, and a second amplifier coupled between said second combiner and said fourth diode to produce said second voltage, said second amplifier having a gain sufficient to provide an amplitude for said second voltage so that at said predetermined value said given voltage is overcome, said fourth diode is forward biased, and said comparator produces on its first output sufficient voltage to back bias said first diode.